United States Patent [19]

Slough

[11] 3,761,803
[45] Sept. 25, 1973

[54] ELECTROSTATIC FIELD STRENGTH MEASURING APPARATUS

[75] Inventor: Carlton M. Slough, Richmond, Va.

[73] Assignee: Texaco Inc., New York, N.Y.

[22] Filed: Dec. 23, 1971

[21] Appl. No.: 211,211

[52] U.S. Cl. .......................... 324/32, 324/72, 331/65
[51] Int. Cl. .............................................. G01r 5/28
[58] Field of Search ................... 324/32, 72; 331/65, 331/116; 340/200; 332/30, 30 V

[56] References Cited
UNITED STATES PATENTS

| | | | |
|---|---|---|---|
| 3,452,275 | 6/1969 | Haines | 324/72 |
| 2,969,503 | 1/1961 | Bustin | 324/72 |
| 3,350,944 | 11/1967 | Michele | 331/65 |
| 3,569,865 | 3/1971 | Healey | 332/30 |

Primary Examiner—Michael J. Lynch
Attorney—Thomas H. Whaley et al.

[57] ABSTRACT

A transmitter, including a crystal controlled oscillator, has a pair of three-sided plates mounted on diagonally opposite corners of a rectangular dielectric body. When placed in an electrostatic field, a static voltage is developed across the plates corresponding to the strength of the electrostatic field. The developed voltage is used to change the amount of capacitance of a tank circuit in the oscillator causing the frequency of a signal provided by the oscillator to change. The signal from the oscillator is transmitted to a receiver which may be remotely located from the electrostatic field. The receiver includes a beat oscillator providing a reference signal having the same frequency as the signal induced by the crystal. A detector compares the frequencies of the reference signal and the received signal to provide a signal having a frequency which is the difference in frequency between the received signal and the reference signal. The frequency of the signal from the detector corresponds to the strength of the electrostatic field. The signal from the detector is applied to an output device, such as a loudspeaker or a meter.

8 Claims, 2 Drawing Figures

ELECTROSTATIC FIELD STRENGTH MEASURING APPARATUS

BACKGROUND OF THE INVENTION

1. Field of the Invention

The present invention relates to meters in general and, more particularly, to an electrostatic field meter.

2. Description of the Prior Art

In recent years several mammoth oil tankers have experienced explosions. The most probable cause of the explosions has been traced to the existence of an electrostatic field in an empty hold of a tanker, when tank washing activities are carried out, and the subsequent discharge in the presence of an explosive atmosphere. Electrostatic field meters, heretofore, distorted the electrostatic field while measuring the field, hence they could not be used to reliably measure the electrostatic field in an empty hold of a tanker. The present invention permits an electrostatic field in an oil tanker to be safely measured without distorting the field.

SUMMARY OF THE INVENTION

Apparatus provides an output which has a frequency corresponding to the strength of an electrostatic field. The apparatus comprises a transmitter, placed in the electrostatic field, which includes a device which develops a static voltage corresponding to the strength of the electrostatic field. A transmitting circuit transmits a signal having one frequency when the electrostatic field strength is zero and having another frequency which corresponds to the strength of the electrostatic field when the electrostatic field strength is not zero in accordance with the voltage from the device. The apparatus also comprises a receiver, which may be located outside of the electrostatic field, which includes a network receiving the transmitted signal and providing a signal having the same frequency as the transmitted signal. The receiver includes a source providing a reference signal having a frequency corresponding to the one frequency of the signal from the transmitting circuit. A second circuit provides the output in accordance with the difference in frequencies between the signal from the network and the reference signal.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
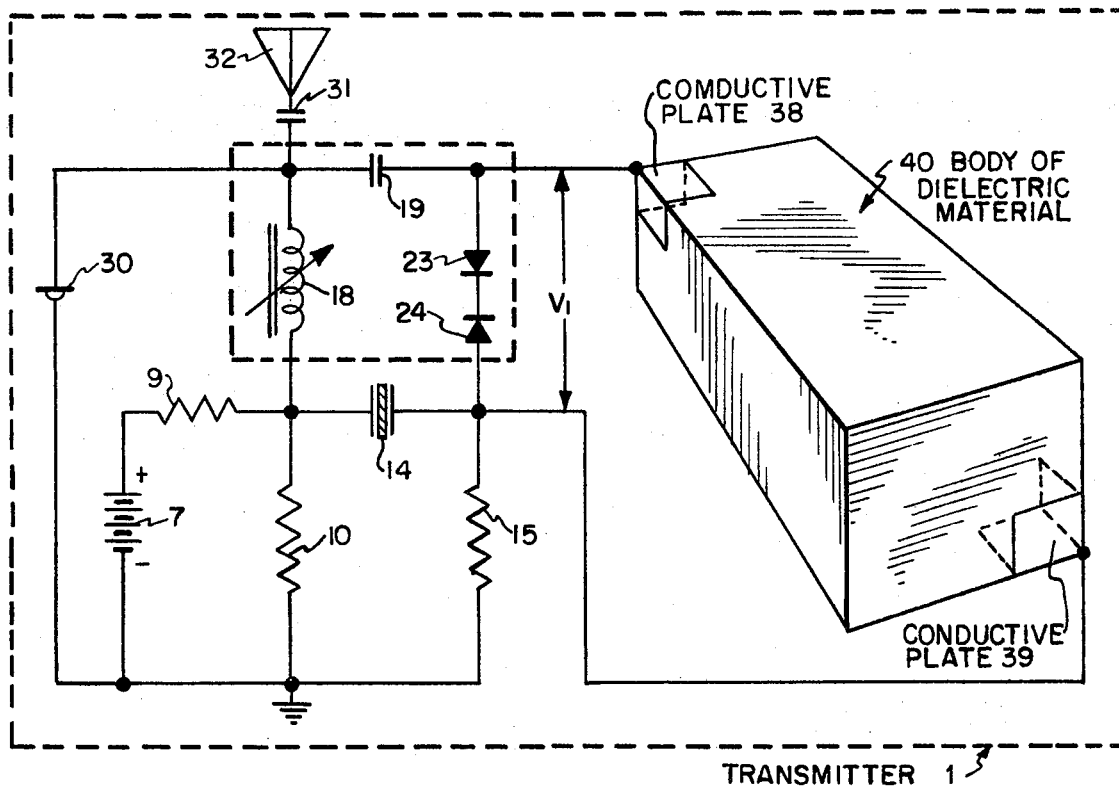
FIGS. 1 and 2 are a schematic drawing and a simplified block diagram, respectively, of a transmitter and a receiver comprising apparatus, constructed in accordance with the present invention, for an audible signal corresponding to the strength of an electrostatic field without distorting the field.
Figure 2:
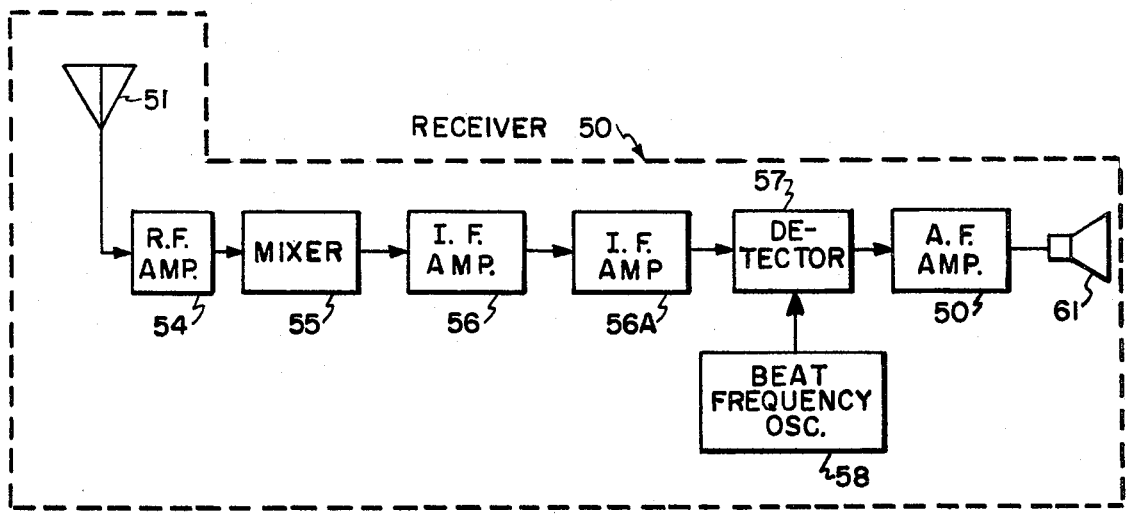

Referring to FIGS. 1 and 2, there is shown apparatus for determining the strength of an electrostatic field which includes a transmitter 1 that is placed in the electrostatic field and which transmits a signal having a frequency corresponding to the strength of the electrostatic field. Transmitter 1 is a crystal-controlled transmitter and includes a battery 7 having its negative terminal connected to a circuit ground 8 and providing power for transmitter 1. Battery 7, which provides a direct current voltage, is applied across a voltage divider consisting of series-connected resistors 9, 10 so that a direct current voltage of a predetermined amplitude is applied across a crystal 14 and a resistor 15 connected in series to ground 8. Crystal 14 induces a signal of a predetermined frequency across a tank circuit 16 which includes a variable inductor 18, a fixed capacitor 19 and diodes 23, 24 series connected across crystal 14. Resistor 15 also provides a common return path to ground for tank circuit 16.

The oscillation of the induced signal is sustained by the operation of a tunnel diode 30, which may be of the type manufactured by the Motorola Company as their part number 1N3712.

The signal from tank circuit 16 passes through a coupling capacitor 31 and is transmitted by an antenna 32.

The circuitry as heretofore described, with the exception of diodes 23 and 24, is conventional. Diode 23 or 24, which may be of the type manufactured by Motorola as their part number MV837, acts as a variable capacitor whose capacitance is controlled by a voltage of proper polarity applied across it. With diodes 23, 24 connected cathode-to-cathode, one of them will function as a variable capacitor in tank circuit 16, the other diode will be shorted out and have no effect. Which diode is shorted out and which diode functions as a variable capacitor is determined by polarity of the static voltage.

A pair of conductive plates 38 and 39, each plate having three faces at right angles to each other, are mounted on diagonally opposite corners of a rectangular body 40 of dielectric material such as plastic. The arrangement of plates 38, 39 and plastic body 40 is such that when placed in an electrostatic field a static voltage is developed across plates 38, 39 corresponding to the strength of the electrostatic field. The static voltage $V_1$ is applied across diodes 23, 24 causing one of the diodes 23 or 24 to have a capacitance corresponding to voltage $V_1$ and hence to the strength of the electrostatic field. Current flow, if any, from plates 38, 39 to diodes 23 and 24 is so small that the electrostatic field is not discharged by transmitter 1 during its operation.

The change in capacitance of diode 23 or 24 affects the overall capacitance of tank circuit 16 causing the frequency of the transmitted signal to change accordingly. Thus, the frequency of the transmitted signal corresponds to the strength of the electrostatic field.

Electrostatic field mills are used as grounded devices extended into the electrostatic field. Such grounded extensions cause intensification of the field in the vicinity of the mill (similar to a lightning rod) and cause the reading which is obtained to be too high. The present device may be used ungrounded and has small mass. Both factors contribute to reliable field readings because distortion of the field is kept to a minimum.

A receiver 50, which may be of the type manufactured by Fanon Electronics as their part number T404, modified as hereinafter explained, includes an antenna 51 for receiving the transmitted signal from transmitter 1. The received signal then goes to a radio frequency amplifier 54. The amplified signal from amplifier 54 is applied to a conventional type mixer 55 where it is combined with a signal from a local oscillator, which is part of mixer 55, in order to shift the carrier frequency so that mixer 55 provides an intermediate frequency signal.

The output from mixer 55 is subjected to two stages of intermediate frequency amplification by IF amplifiers 56 and 56A. The amplified signal from amplifier 56A is applied to a detector 57 receiving a signal from a beat frequency oscillator 58. Oscillator 58 is not part of the receiver that may be purchased from Fanon Electronics and the inclusion of oscillator 58 comprises the modification to the Fanon receiver. The frequency of the signal from oscillator 58 corresponds to the frequency of the signal developed by crystal 14 in transmitter 1 after it has been received and shifted to the intermediate frequency. Detector 57 provides an output having a frequency that is the difference between the frequencies, the signal from amplifier 56A and the frequency of the signal from oscillator 58. The difference in frequency corresponds directly to the electrostatic field being measured. The output from detector 57 is amplified by audio frequency amplifier 60 and applied to a loudspeaker 61. The output of audio amplifier 60 may also be applied to a meter or a recorder device so that the change in frequency may be read directly and recorded as well as heard.

The apparatus of the present invention as heretofore described measures the strength of an electrostatic field without distorting the electrostatic field. The apparatus includes a transmitter in the electrostatic field, which transmits a signal having a frequency corresponding to the strength of the electrostatic field, and a receiver, which may be located outside of the electrostatic field, for receiving the transmitted signal and providing an indication as to the strength of the electrostatic field. The transmitter includes a pair of conductive plates, separated by a dielectric material, to develop a voltage in the electrostatic field which is used to change the capacitance in a tank circuit in an oscillator in the transmitter so that the frequency provided by the oscillator changes as a function of the strength of the electrostatic field.

I claim:

1. Apparatus for providing an output corresponding to the strength of an electrostatic field in a gaseous environment, comprising a transmitter placed in the gaseous enviroment, said transmitter includes a pair of conductive plates, a body of dielectric material, said plates being mounted on said body so that a voltage is developed across said plates corresponding to the strength of the electrostatic field, a pair of variable cpacitance diodes connected back to back across said plates, oscillator circuit means connected to said diodes in such a manner that the oscillator provides an output having a frequency which is affected by the diodes responding to said voltage, and means connected to said oscillator for transmitting the output from said oscillator; and a receiver which may be located outside of the gaseous environment and which comprises means for receiving the transmitted output, signal means connected to the receiving means for providing a signal having the same frequency as the received signal, means for providing a reference signal having a frequency corresponding to an unaffected frequency of the oscillator output, and means connected to the signal means and to the reference signal means for providing the output in accordance with the signal from the signal means and the reference signal.

2. Apparatus as described in claim 1 in which each diode is of the type whose capacitance varies proportionally to the amplitude of a voltage of proper polarity applied across the diode.

3. Apparatus as described in claim 1 in which the body of dielectric material is rectangular body and the plates are mounted at opposite corners of the body of the dielectric material.

4. Apparatus as described in claim 3 in which each plate is a single piece of conductive material formed to have three surface planes at right angles to each other.

5. A transmitter for transmitting a signal corresponding to the strength of an electrostatic field in a gaseous environment when placed in the gaseous environment, comprising a pair of conductive plates, a body of dielectric material, said plates being mounted on said body s0 that a voltage is developed across said plates corresponding to the strength of the electrostatic field when said plates are in the presence of an electrostatic field, a pair of variable capacitance diodes connected back to back across said plates, oscillator circuit means connected to said diodes in such a manner that the oscillator provides an output having a frequency which is affected by the diodes responding to said voltage, and means connected to said oscillator for transmitting the output from said oscillator as the signal.

6. A transmitter as described in claim 5 in which each diode is of the type whose capacitance varies proportionally to the amplitude of a voltage of proper polarity applied across the diode.

7. A transmitter as described in claim 6 in which the body of dielectric material is rectangular body and the plates are mounted at opposite corners of the body of the dielectric material.

8. A transmitter as described in claim 7 in which each plate is a single piece of conductive material formed to have three surface planes at right angles to each other.

* * * * *